United States Patent
Xu et al.

(10) Patent No.: US 11,265,128 B2
(45) Date of Patent: Mar. 1, 2022

(54) SEARCH SPACE SET OCCASION LEVEL MAPPING FOR PDCCH OVERBOOKING

(71) Applicant: QUALCOMM Incorporated, San Diego, CA (US)

(72) Inventors: Huilin Xu, San Diego, CA (US); Jing Sun, San Diego, CA (US); Heechoon Lee, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 16/394,795

(22) Filed: Apr. 25, 2019

(65) Prior Publication Data

US 2019/0334681 A1    Oct. 31, 2019

Related U.S. Application Data

(60) Provisional application No. 62/664,898, filed on Apr. 30, 2018.

(51) Int. Cl.
*H04L 5/00* (2006.01)
*H04L 27/26* (2006.01)
(Continued)

(52) U.S. Cl.
CPC .......... *H04L 5/0053* (2013.01); *H04L 1/0038* (2013.01); *H04L 27/2676* (2013.01); *H04W 72/0413* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2009/0046646 A1* | 2/2009 | Cho | H04L 5/0055 370/329 |
| 2014/0293924 A1* | 10/2014 | Wang | H04W 72/042 370/329 |

(Continued)

OTHER PUBLICATIONS

Catt: "NR PDCCH Search Space", 3GPP Draft; R1-1717823 NR PDCCH Search Space, 3rd Generation Partnership Project (3GPP), Mobile Competence Centre, 650, Route Des Lucioles ; F-06921 Sophia-Antipolis Cedex, France, vol. RAN WG1, No. Prague, Czechia; Oct. 9, 2017-Oct. 13, 2017 Oct. 8, 2017 (Oct. 8, 2017), XP051341008, Retrieved from the Internet: URL:http://www.3gpp.org/ftp/Meetings_3GPP_SYNC/RAN1/Docs/ [retrieved on Oct. 8, 2017], sections 1-4, 5 pages.

(Continued)

*Primary Examiner* — Ajit Patel
*Assistant Examiner* — Liem H. Nguyen
(74) *Attorney, Agent, or Firm* — Qualcomm Incorporated

(57) ABSTRACT

Various aspects of the present disclosure generally relate to wireless communication. In some aspects, a wireless communication device may determine that a threshold is satisfied with regard to a search space set mapping, for a plurality of search space sets, for a slot of a downlink control channel, wherein the threshold relates to at least one of: a slot-based control channel element limit, or a slot-based blind decode limit; and perform a mapping or monitor a subset of search space set occasions, of a search space set of the plurality of search space sets, in the slot in connection with determining that the threshold is satisfied. Numerous other aspects are provided.

30 Claims, 7 Drawing Sheets

(51) Int. Cl.
*H04L 1/00* (2006.01)
*H04W 72/04* (2009.01)

(56) References Cited

U.S. PATENT DOCUMENTS

| | | | |
|---|---|---|---|
| 2016/0242039 A1* | 8/2016 | Drugge | H04W 74/0816 |
| 2017/0332359 A1* | 11/2017 | Tsai | H04B 7/0639 |
| 2019/0103947 A1* | 4/2019 | Park | H04L 1/1896 |
| 2019/0150073 A1* | 5/2019 | Tiirola | H04W 72/10 |
| | | | 455/434 |
| 2019/0223164 A1* | 7/2019 | He | H04W 76/11 |
| 2019/0230689 A1* | 7/2019 | Cao | H04L 1/0068 |
| 2019/0335425 A1* | 10/2019 | Seo | H04L 5/0053 |
| 2020/0021419 A1* | 1/2020 | Taherzadeh Boroujeni | |
| | | | H04L 5/0091 |
| 2020/0120584 A1* | 4/2020 | Yi | H04L 5/0048 |
| 2020/0213983 A1* | 7/2020 | Zhang | H04L 5/00 |
| 2020/0275420 A1* | 8/2020 | Chen | H04L 5/0048 |
| 2020/0382174 A1* | 12/2020 | Shao | H04L 5/0094 |

OTHER PUBLICATIONS

International Search Report and Written Opinion—PCT/US2019/029328—ISA/EPO—dated Aug. 2, 2019.
Potevio: "Discussion on Search Space", 3GPP Draft; R1-1804240, 3rd Generation Partnership Project (3GPP), Mobile Competence Centre, 650, Route Des Lucioles ; F-06921 Sophia-Antipolis Cedex, France, vol. RAN WG1, No. Sanya, China; Apr. 16, 2018-Apr. 20, 2018 Apr. 15, 2018, XP051426528, Retrieved from the Internet: URL: http://www.3gpp.org/ftp/Meetings%5F3GPP%5FSYNC/RAN1/Docs/ [retrieved on Apr. 15, 2018], sections 1-3, 4 pages.
Samsung: "Remaining Issues on Search Space Design", 3GPP Draft; R1-1720320 Remaining Issues on Search Space Design, 3rd Generation Partnership Project (3GPP), Mobile Competence Centre, 650, Route Des Lucioles ; F-06921 Sophia-Antipolis Cedex, France, vol. RAN WG1, No. Reno, USA; Nov. 27, 2017-Dec. 1, 2017, Nov. 18, 2017, XP051369910, Retrieved from the Internet: URL:http://www.3gpp.org/ftp/tsg%5Fran/WG1%5FRL1/TSGR1%5F91/Docs/ [retrieved on Nov. 18, 2017], sections 1-3, 7 pages.

* cited by examiner

SEARCH SPACE SET OCCASION LEVEL MAPPING FOR PDCCH OVERBOOKING

CROSS-REFERENCE TO RELATED APPLICATIONS UNDER 35 U.S.C. § 119

This application claims priority to Provisional Patent Application No. 62/664,898, filed on Apr. 30, 2018, entitled "TECHNIQUES AND APPARATUSES FOR SEARCH SPACE SET OCCASION LEVEL MAPPING FOR PDCCH OVERBOOKING," which is hereby expressly incorporated by reference herein.

FIELD OF THE DISCLOSURE

Aspects of the present disclosure generally relate to wireless communication, and more particularly to techniques and apparatuses for search space set occasion level mapping for physical downlink control channel (PDCCH) overbooking.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include determining that at least one of a slot-based control channel element limit or a slot-based blind decode limit is exceeded with regard to a search space set mapping for a plurality of search space sets, wherein each search space set, of the plurality of search space sets, includes a respective plurality of search space set occasions; and performing a mapping of a subset of search space set occasions, of a search space set of the plurality of search space sets, in the slot in connection with determining that at least one of the slot-based control channel element limit or the slot-based blind decode limit is exceeded.

In some aspects, a wireless communication device for wireless communication may include memory and one or more processors operatively coupled to the memory. The memory and the one or more processors may be configured to determine that at least one of a slot-based control channel element limit or a slot-based blind decode limit is exceeded with regard to a search space set mapping for a plurality of search space sets, wherein each search space set, of the plurality of search space sets, includes a respective plurality of search space set occasions; and perform a mapping of a subset of search space set occasions, of a search space set of the plurality of search space sets, in the slot in connection with determining that at least one of the slot-based control channel element limit or the slot-based blind decode limit is exceeded.

In some aspects, a non-transitory computer-readable medium may store one or more instructions for wireless communication. The one or more instructions, when executed by one or more processors of a wireless communication device, may cause the one or more processors to determine that at least one of a slot-based control channel element limit or a slot-based blind decode limit is exceeded with regard to a search space set mapping for a plurality of search space sets, wherein each search space set, of the plurality of search space sets, includes a respective plurality of search space set occasions; and perform a mapping of a subset of search space set occasions, of a search space set of the plurality of search space sets, in the slot in connection with determining that at least one of the slot-based control channel element limit or the slot-based blind decode limit is exceeded.

In some aspects, an apparatus for wireless communication may include means for determining that at least one of a slot-based control channel element limit or a slot-based blind decode limit is exceeded with regard to a search space set mapping for a plurality of search space sets, wherein each search space set, of the plurality of search space sets, includes a respective plurality of search space set occasions; and means for performing a mapping of a subset of search space set occasions, of a search space set of the plurality of search space sets, in the slot in connection with determining that at least one of the slot-based control channel element limit or the slot-based blind decode limit is exceeded.

Aspects generally include a method, apparatus, system, computer program product, non-transitory computer-readable medium, user equipment, base station, wireless communication device, and processing system as substantially described herein with reference to and as illustrated by the accompanying drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
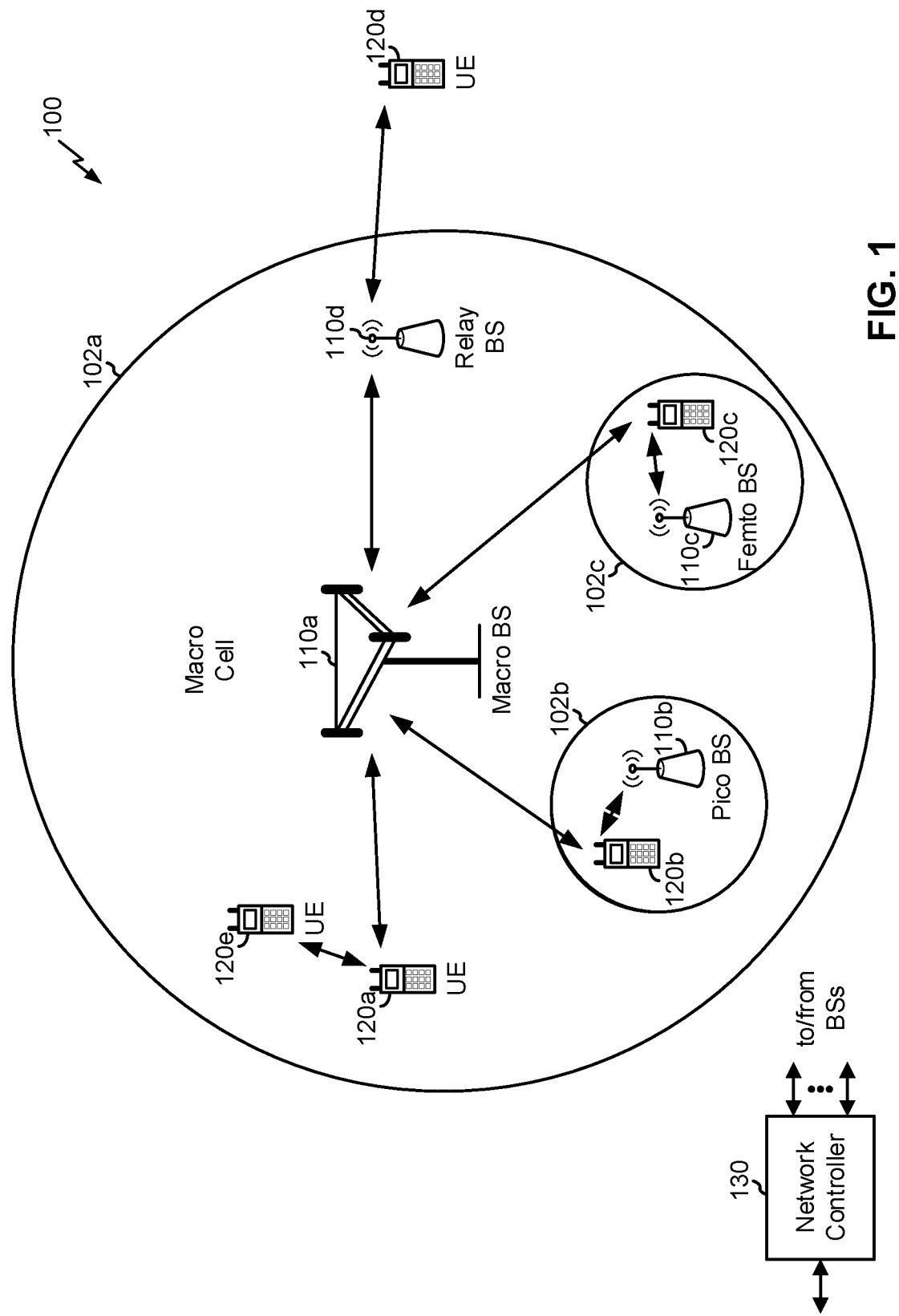
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meters, a sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided as an example. Other examples may differ from what is described with regard to FIG. 1.

Figure 2:
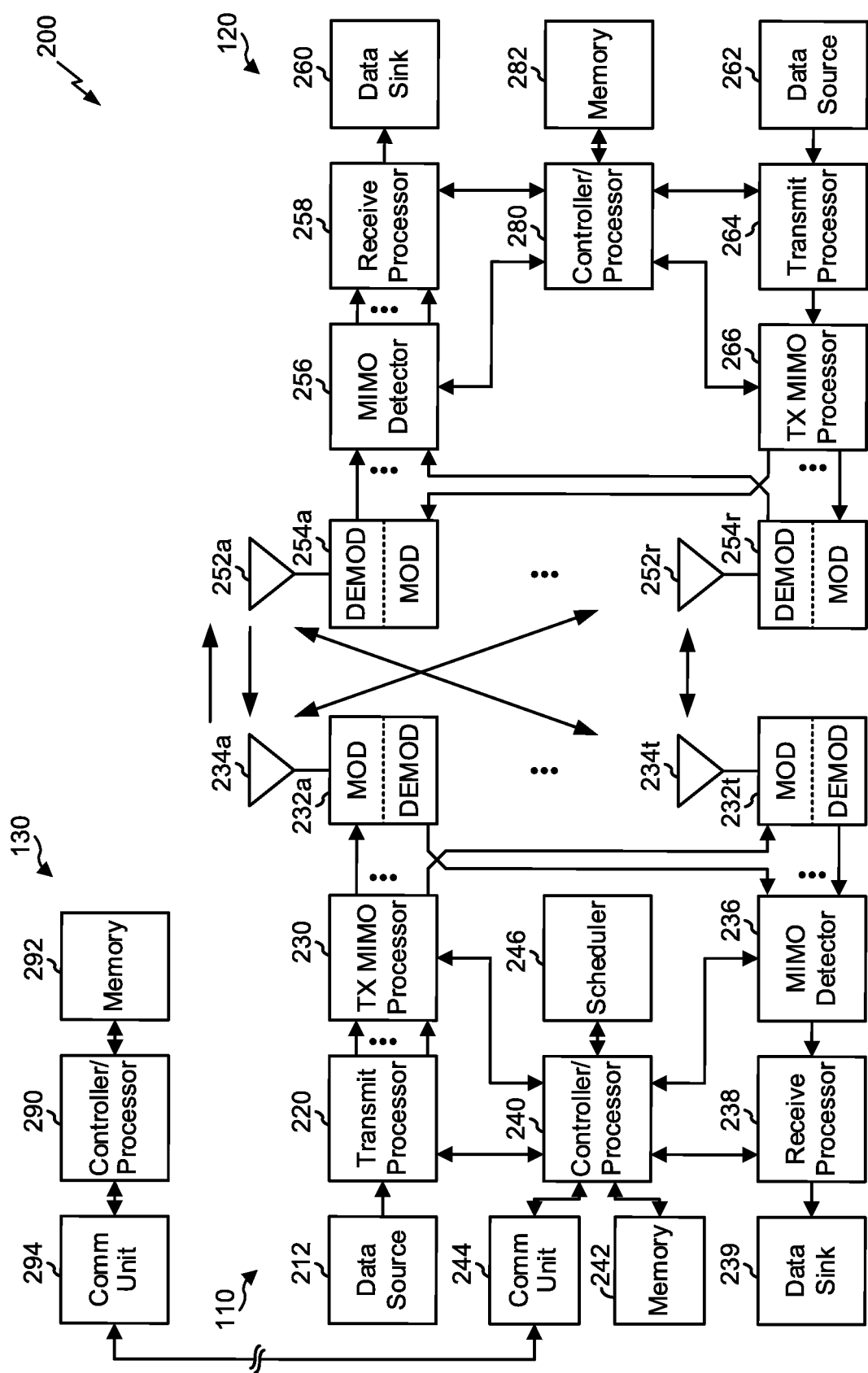
FIG. 2 is a block diagram conceptually illustrating an example of a base station in communication with a user equipment (UE) in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with search space set occasion level mapping for physical downlink control channel (PDCCH) overbooking, as described in more detail elsewhere herein. For example, controller/processor 240 of BS 110, controller/processor 280 of UE 120, and/or any other component(s) of FIG. 2 may perform or direct operations of, for example, process 600 of FIG. 6 and/or other processes as described herein. Memories 242 and 282 may store data and program codes for BS 110 and UE 120, respectively. A scheduler 246 may schedule UEs for data transmission on the downlink and/or uplink.

In some aspects, a wireless communication device (e.g., BS 110 or UE 120) may include means for determining that a threshold is satisfied with regard to a search space set mapping, for a plurality of search space sets, for a slot of a downlink control channel, means for performing a mapping of a subset of search space set occasions, of a search space set of the plurality of search space sets, in the slot in connection with determining that the threshold is satisfied, and/or the like. In some aspects, such means may include one or more components of BS 110 or UE 120 described in connection with FIG. 2.

As indicated above, FIG. 2 is provided merely as an example. Other examples may differ from what is described with regard to FIG. 2.

Figure 3:
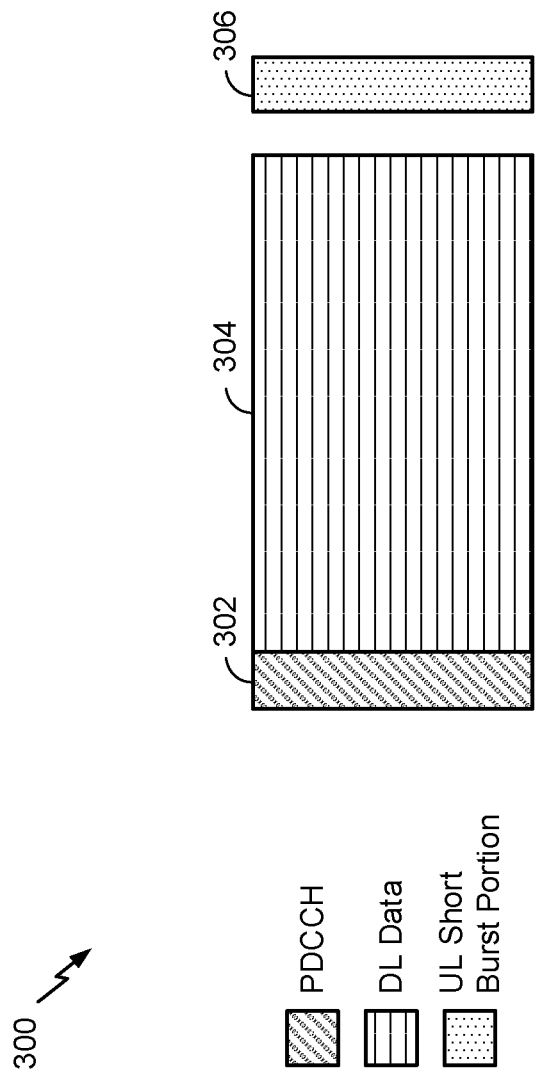
FIG. 3 is a diagram illustrating an example of a downlink (DL)-centric slot, in accordance with various aspects of the present disclosure.

FIG. 3 is a diagram 300 showing an example of a DL-centric slot or wireless communication structure. The DL-centric slot may include a control portion 302. The control portion 302 may exist in the initial or beginning portion of the DL-centric slot. The control portion 302 may include various scheduling information and/or control information corresponding to various portions of the DL-centric slot. In some configurations, the control portion 302 may be a physical DL control channel (PDCCH), as indicated in FIG. 3. In some aspects, the control portion 302 may include legacy PDCCH information, shortened PDCCH (sPDCCH) information), one or more grants (e.g., downlink grants, uplink grants, and/or the like), and/or the like.

The DL-centric slot may also include a DL data portion 304. The DL data portion 304 may sometimes be referred to as the payload of the DL-centric slot. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH).

The DL-centric slot may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric slot. For example, the UL short burst portion 306 may include feedback information corresponding to the control portion 302 and/or the data portion 304. Non-limiting examples of information that may be included in the UL short burst portion 306 include an acknowledgment (ACK) signal (e.g., a physical uplink control channel (PUCCH) ACK, a physical uplink shared channel (PUSCH) ACK, an immediate ACK), a negative ACK (NACK) signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 3 is provided as an example. Other examples may differ from what is described with regard to FIG. 3.

Figure 4:
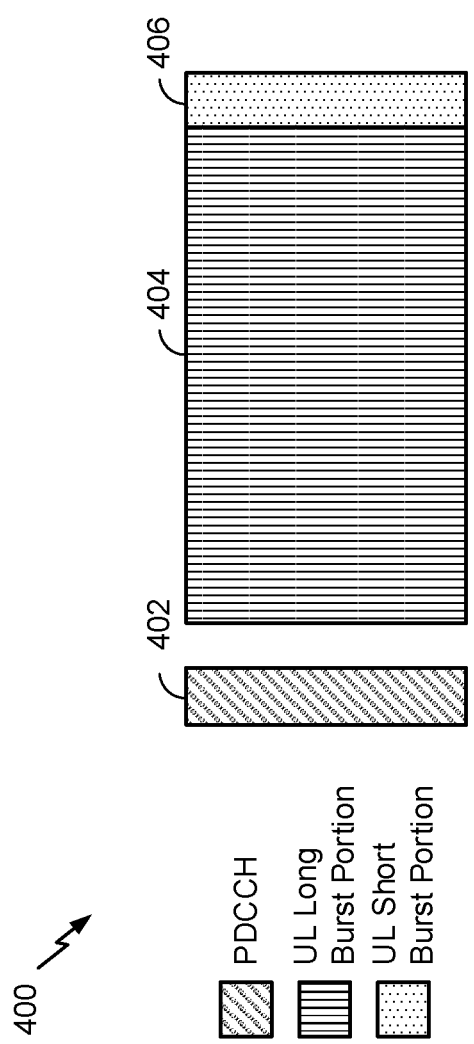
FIG. 4 is a diagram illustrating an example of an uplink (UL)-centric slot, in accordance with various aspects of the present disclosure.

FIG. 4 is a diagram 400 showing an example of an UL-centric slot or wireless communication structure. The UL-centric slot may include a control portion 402. The control portion 402 may exist in the initial or beginning portion of the UL-centric slot. The control portion 402 in FIG. 4 may be similar to the control portion 302 described above with reference to FIG. 3. The UL-centric slot may also include an UL long burst portion 404. The UL long burst portion 404 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 402 may be a physical DL control channel (PDCCH).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 406. The UL short burst portion 406 in FIG. 4 may be similar to the UL short burst portion 306 described above with reference to FIG. 3, and may include any of the information described above in connection with FIG. 3. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 4 is provided as an example. Other examples may differ from what is described with regard to FIG. 4.

In 5G/NR, the physical downlink control channel (PDCCH) is defined within a search space set, and a search space set is associated with a control resource set (CORESET). Multiple CORESETs can be configured for each UE. Each CORESET can have multiple search space sets. Each search space set contains multiple search spaces with different aggregation levels. Each search space is associated with a single aggregation level. The UE decodes the PDCCH within a search space from the PDCCH candidates. A PDCCH candidate is a set of resources that is determined by the cell-specific radio network temporary identifier and by a slot number. The resources of a common search space (CSS) PDCCH candidate may be determined according to the slot number.

Frequency resources may be allocated per CORESET by a bitmap of resource block groups in the frequency domain. Time domain duration may be specified per CORESET by a number of consecutive OFDM symbols in the time domain and the location of the first symbol of the consecutive OFDM symbols. Time and frequency resources are allocated to a PDCCH in the unit of control channel elements (CCEs).

CCEs corresponding to a PDCCH candidate may be a function of a hash value $Y_{p,k}$. For a search space set in CORESET p, the hash value $Y_{p,k}$ may be computed by $Y_{p,k}=(A_p \cdot Y_{p,k-1})$ mod D, wherein k is the index of the hash value $Y_{p,k}$, $A_p$ is a integer number defined to CORESET p, D is an integer number used by the hash function, and $Y_{p,-1}$ is an integer number used to compute the first hash value by $Y_{p,0}=(A_p \cdot Y_{p,-1})$ mod D.

PDCCH frequency domain resource and time domain duration are configured per CORESET with a set of resource blocks as the frequency domain resources and a number of consecutive symbols as a time domain duration of the CORESET. The PDCCH time domain location may be configured per search space set with a PDCCH monitoring periodicity of $K_{p,s}$ slots, a PDCCH monitoring offset of $O_{p,s}$ slots (e.g., 1 slot may be 14 symbols for 5G/NR), and a PDCCH monitoring pattern within a slot, indicating first symbol(s) of the search space set within a slot for PDCCH monitoring. Different search space sets may partially or complete overlapped. The BS may transmit PDCCH in multiple PDCCH candidate locations in the search space sets. The UE may try to decode PDCCH from each of the candidate locations.

5G/NR may impose limits on the number of search space sets that may be mapped to a slot, in order to reduce UE complexity and conserve resources that would be used to perform blind decoding for a large number of search space sets. For example, the limits may include a blind decode limit and a control channel element (CCE) limit, which may be applied on a per-slot basis. However, when multiple search space sets with different periodicities and offsets are configured, peak numbers of configured blind decodes and/or CCEs in a slot may exceed the respective limits. Furthermore, if the network configuration follows the blind decode and CCE limits in all slots, the average configured number of blind decodes and CCEs could be much lower than the respective limits, thereby wasting network resources.

5G/NR allows search space set overbooking. With overbooking, when the PDCCH configuration exceeds the blind decode limit and/or the CCE limit for a slot, a wireless communication device (e.g., BS 110 or UE 120) may remove one or more search space sets in the slot so that the blind decodes and the CCEs do not exceed the respective limits. In some aspects, a wireless communication device may map the search space sets based at least in part on search space set indices of the search space sets. For example, a search space set with a lowest index may be mapped first, and so on. When the blind decode limit and/or the CCE limit is exceeded before an entire search space set is mapped, the wireless communication device may withdraw the partial mapping result of the entire search space set, release the mapped CCEs or blind decodes, and stop mapping other search space sets to the slot.

The above overbooking approach may be problematic in certain cases, such as when a mini-slot configuration is used (e.g., a Case 2 configuration). A mini-slot configuration may be a configuration wherein a transmission periodicity is smaller than the 14 symbols associated with a slot. For example, one slot may contain multiple mini-slots. The interaction of multiple mini-slots (with respective PDCCHs and respective UESSs) and a PDCCH for a slot in which the multiple mini-slots are contained may cause the blind decode limit and/or the CCE limit to be exceeded. As a first example, consider the case when mini-slots are configured to use 1 CSS and 1 UESS, a CCE limit is 56, a minimum aggregation level of 8 is required for mini-slot coverage, and a maximum number of mini-slots that can be configured in a slot is 7. If all 7 mini-slots are configured, and if a CSS is configured for the slot, the remaining CCEs for the slot may be less than 56 and thus no mini-slot may be scheduled. In other words, the scheduling of the CSS for the slot may mean that UESSs for mini-slots are not fully available, so no mini-slot is scheduled. This may reduce flexibility of scheduling.

As another example, consider a case when a slot (e.g., a non-mini-slot) is configured to use 1 CSS and 1 UESS when mini-slots are configured to use 1 UESS, a CCE limit of 56 is used, a minimum aggregation level 8 is used for mini-slot coverage, and the maximum number of mini-slots that can be configured in a slot is 7. In that case, in a slot where all of the UESSs (e.g., for the slot and the mini-slots) are configured and the CSS of the slot is not configured, if the non-mini-slot UESS is mapped first, the mini-slot UESS may not be mapped, which is a waste of CCEs. Conversely, if the mini-slot UESS is mapped first, the non-mini-slot UESS may not be mapped, so the largest UESS set may effectively block all smaller UESS sets. As illustrated by the above examples, the dropping of an entire search space set in connection with a blind decode limit or a CCE limit may reduce the effectiveness and utilization of mini-slots in 5G/NR.

Some techniques and apparatuses described herein may determine that a search space set mapping for a plurality of search space sets exceeds at least one of a blind decode limit or a CCE limit, and may map a subset of search space set occasions of a search space set of the plurality of search space sets. For example, the subset of search space set occasions may include less than all search space set occasions of the search space set. Techniques and apparatuses described herein may map the subset of search space set occasions so that the blind decode limit and the CCE limit are not exceeded while preserving part of the search space set, rather than dropping all of the search space set. In this way, when a blind decode limit or CCE limit may be exceeded for a slot, such as in the case of multiple mini-slots per slot, less than an entirety of a search space set may be dropped so that the blind decode limit and the CCE limit are satisfied while at least some of the search space set occasions for the mini-slots are preserved. This may improve PDCCH efficiency and may enable the usage of multiple mini-slots per slot (or an increased number of mini-slots per slot).

Figure 5:
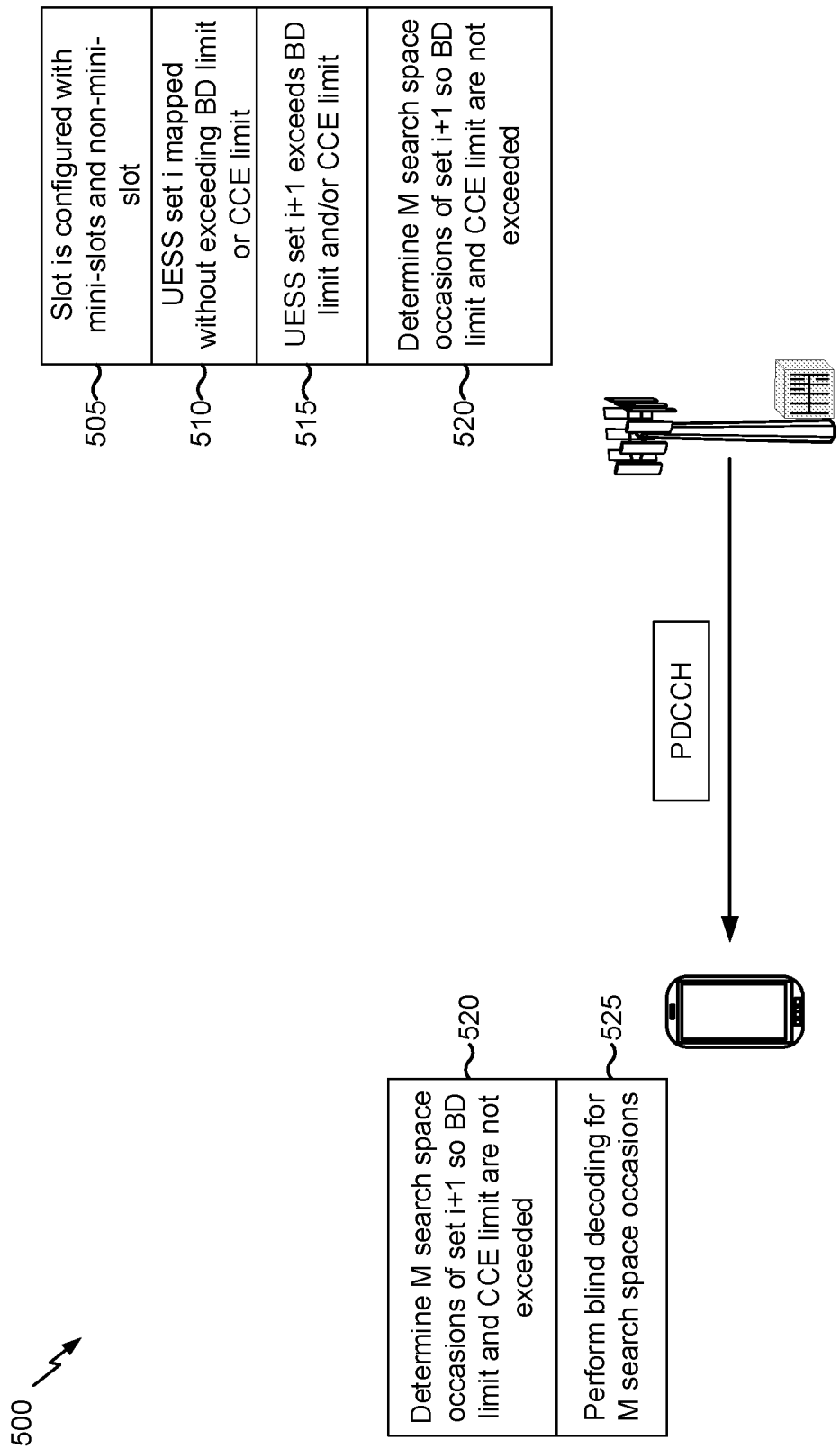
FIG. 5 is a diagram illustrating an example of search space set occasion level mapping for PDCCH overbooking, in accordance with various aspects of the present disclosure.

FIG. 5 is a diagram illustrating an example 500 of search space set occasion level mapping for PDCCH overbooking, in accordance with various aspects of the present disclosure. The operations described in FIG. 5 are performed by a BS 110 and/or a UE 120. Some aspects described herein may be performed by a wireless communication device, which may be BS 110 and/or UE 120. For example, some of the operations described in connection with FIG. 5 may be performed by both BS 110 and UE 120, such as determining a mapping of search space set occasions. The BS 110 may determine the mapping of search space set occasions so that the BS 110 can transmit control information in appropriate search spaces. The UE 120 may determine the mapping of each search space set occasion so that the UE 120 can perform blind decoding in the appropriate search spaces.

As shown in FIG. 5, and by reference number 505, a slot may be configured to use mini-slots and non-mini-slots. A non-mini-slot may refer to a slot having more symbols than a mini-slot, as described with regard to FIG. 5. For example, a non-mini-slot may include an entire slot or a portion of a slot. When a slot is configured to use mini-slots and non-mini-slots, a wireless communication device may encounter difficulties with overbooking of PDCCHs based at least in part on the blind decode limit and/or the CCE limit of the slot. For instance, in a given slot, a UE may need to monitor search spaces associated with the regular slot and search spaces associated with its mini-slot configuration, each of which may count towards the applicable CCE or blind decoding limits. Thus, the wireless communication device may perform the operations described below to improve PDCCH performance without restricting the number of mini-slots that can be used for the slot.

As shown by reference number 510, the BS 110 may map a UESS set i to a slot. Here, the BS 110 maps the UESS set i without exceeding a blind decode (BD) limit or a CCE limit of the UE 120. For example, the blind decode limit or the CCE limit may be per-slot limits for a number of blind decodes or CCEs to be associated with a single UE 120. The value i may be a search space set index of the UESS set. The BS 110 may map UESS sets 0 through i based at least in part on search space set indices of the UESS sets 0 through i (e.g., in ascending order).

In some aspects, the BS 110 may first map a CSS set to a slot. For example, the BS 110 may first map the CSS set since the CSS set may be configured not to exceed the blind decode limit or the CCE limit. In some aspects, the BS 110 may map all CSS sets to the PDCCH before mapping any UESS sets. In some aspects, the BS 110 may map one or more CSS sets to the PDCCH before mapping any UESS sets.

As shown by reference number 515, the BS 110 may determine that a UESS set i+1, if mapped to the slot, would exceed the blind decode limit and/or the CCE limit. In some aspects, the UE 120 may determine that monitoring the UESS set i+1 would exceed the blind decode limit and/or the CCE limit. In a legacy configuration, if the UESS set i+1 exceeds the blind decode limit and/or the CCE limit, the BS 110 (or UE 120) may drop (e.g., may not monitor) an entirety of the UESS set i+1. This may lead to dropping of search spaces for UESSs for the mini-slots (when a UESS for the non-mini-slot is mapped first) or for the non-mini-slot (when one or more UESSs for the mini-slots are mapped first).

In some aspects, the BS 110 or the UE 120 may determine that the UESS set i+1 exceeds a limit when all PDCCH candidates (e.g., search space set occasions) of all UESS sets of the UE 120 are to be monitored or mapped. In some aspects, the BS 110 or the UE 120 may determine that the UESS set i+1 exceeds the limit after all PDCCH candidates (e.g., search space set occasions) of the UESS set i+1 are to be monitored or mapped.

In some aspects, the BS 110 may determine that the UESS set i+1 would exceed the blind decode limit and/or the CCE limit based at least in part on a threshold. The threshold may indicate that a next UESS set, if mapped to the slot or monitored in the slot, would cause the blind decode limit and/or the CCE limit to be exceeded. For example, the threshold may be based at least in part on a number of blind decodes mapped in a particular slot before the UESS set i+1, based at least in part on a number of CCEs in a particular slot before the UESS set i+1, and/or the like. In other words, in some aspects, the BS 110 or the UE 120 may determine that the UESS set i+1 would exceed a limit in a forward-looking fashion. In some aspects, the UE 120 may determine that the UESS set i+1 exceeds the limit in a rearward-looking fashion (e.g., after monitoring the UESS set i+1).

As shown by reference number 520, the BS 110 and the UE 120 may determine M search space set occasions of the UESS set i+1 so that the BD limit and the CCE limit are not exceeded for the UE 120. The M search space set occasions may be a subset of search space set occasions of the UESS set i+1 (e.g., less than all search space set occasions of the UESS set i+1). In some aspects, the BS 110 and/or the UE 120 may drop UESS sets after the UESS set i+1. By mapping or monitoring the subset of the search space set occasions, at least some search spaces may be provided for the mini-slots and for the non-mini-slot. This may allow the usage of mini-slots while satisfying BD limits and CCE limits, thereby improving efficiency of resource allocation and reducing the number of dropped search spaces. As shown by reference number 525, the UE 120 may perform blind decoding for the M search space set occasions (e.g., in addition to blind decoding for the search space set occasions of the UESSs 0 through i).

In some aspects, the BS 110 and/or the UE 120 may determine a value of M. For example, in some cases, the exact value of M may not be known before mapping is finished. The value of M may be used to determine a structure of an interleaver (described in more detail below) and/or an index interval (also described in more detail below) for mapping the search space set occasions. In some aspects, a configured value may be used for M. For example, the configured value may be signaled by the BS 110 (e.g., using radio resource control (RRC) signaling and/or the like), or may be preconfigured based at least in part on a specification or static configuration of the UE 120. In some aspects, BS 110 or UE 120 may estimate M based at least in part on a number of remaining CCEs, a current UESS set, and/or the like.

In some aspects, the BS 110 may determine the mapping and the UE 120 may determine how to monitor the M search space set occasions. In a first example, the BS 110 may continuously map the search space set occasions based at least in part on occasion indices of the search space set occasions and the UE 120 may monitor based on the occasion indices up to the applicable CCE and/or blind decoding limits. In such a case, the occasion indices of the search space set occasions may be cyclically shifted before mapping is performed. For example, the cyclic shift may change every K slots, wherein K may be explicitly configured using RRC, implicitly configured by the BS 110, or known to the BS 110 and the UE 120 (e.g., based at least in part on an agreement or specification).

A more detailed explanation of the cyclic shift follows. For example, suppose M=3 of N=7 occasions are mapped from UESS set i+1. The UESS set occasions are indexed by 0, 1, ..., N−1, wherein a smaller index corresponds to an earlier starting symbol of the occasion. For example, as used herein, a search space set occasion with a smaller occasion index may correspond to an earlier starting symbol than a search space set occasion with a larger occasion index. The cyclic shift operation may be defined by $f(m)=\text{mod}(m+Y,N)$, $m=0, 1, \ldots, M-1$, wherein Y is the cyclic shift. The UESS set occasions may be continuously mapped based on the cyclically shifted occasion index starting from the first index.

For example, with a cyclic shift=0, 3 occasions may be chosen with indices 0, 1, and 2. With cyclic shift=1, the cyclically shifted UESS set occasion indices are 1, 2, 3, 4, 5, 6, and 0. Starting from the first occasion, 3 occasions are continuously chosen with indices 1, 2, 3. With cyclic shift=5, the cyclically shifted UESS set occasion indices are 5, 6, 0, 1, 2, 3, 4. Starting from the first occasion, 3 occasions are continuously chosen with indices 5, 6, 0.

In a second example, the occasion indices of the search space set occasions may be interleaved before mapping is performed. Thereafter, occasions may be mapped from a first interleaved occasion index to a last interleaved occasion index. For example, the interleaver can be any type of interleaver (e.g., a block interleaver, a convolutional interleaver, etc.). In a block interleaver, an occasion index may be input to the block horizontally, and may be read from the block vertically. A number of columns of the block can be determined by the remaining number of CCEs after UESS set i is mapped, the aggregation level, and the number of candidates per aggregation level for UESS set i+1. In some aspects, the interleaved occasion indices may be determined using a cyclic shift. Example configurations for interleavers with different cyclic shifts are shown below.

| 0 | 1 |
|---|---|
| 2 | 3 |
| 4 | 5 |
| 5 |   |

Example 1

M=3 of N=7 search space set occasions are chosen. The number of rows for the interleaver may be R=M+1. The number of columns may be ceil(N/R)=2, ceil is the ceiling operation. With cyclic shift=0, occasions 0, 2, and 4 may be outputted first by the interleaver.

| 5 | 6 |
|---|---|
| 0 | 1 |
| 2 | 3 |
| 4 |   |

Example 2

M=3 of N=7 search space set occasions are chosen. The number of rows for the interleaver may be R=M+1. The number of columns may be ceil(N/R)=2. With cyclic shift=5 at interleaver input, occasions 5, 0, and 2 may be outputted first by the interleaver. For example, the interleaver input may be cyclically shifted before mapping. Without cyclic shift, the interleaver output for all occasions is a sequence of 0, 2, 4, 6, 1, 3, 5. With cyclic shift=5 at interleaver output, the shifted version of the interleaver output is 3, 5, 0, 2, 4, 6, 1. If M=3 occasions are chosen, occasions 0, 3, and 5 may be chosen. For example, the interleaved occasion index may be cyclically shifted before mapping to the slot. In the above examples, the cyclic shift may (or may not) change once every K cycles.

In a third example, the occasion indices for the mapping may be selected at a fixed interval. For example, assume that M of N occasions are chosen in mapping candidates of the UESS set i+1. In such a case, and in one example, the fixed interval may be defined as mod(Y+m*N/M,N), where m=0, . . . , M−1. Other non-limiting examples of fixed intervals include mod(Y+⌈m*N/M⌉,N), mod(Y+⌊m*N/M⌋, N), mod(Y+round(m*N/M), N), mod(Y+m*⌈N/M⌉,N), mod (Y+m*⌊N/M⌋,N), and mod(Y+m*round(N/M),N). In the above cases, a cyclic shift may be applied before the fixed interval is applied or after the fixed interval is applied.

In a fourth example, the occasion indices for the mapping may be determined based at least in part on a random permutation of the search space set occasions. For example, suppose M=3 of N=7 occasions are mapped from UESS set i+1. The UESS set occasions may be indexed by 0, 1, N−1, wherein a smaller index corresponds to an earlier starting symbol of the occasion. The BS 110 or UE 120 may determine a permutated sequence of m∈[0, 1 . . . , N−1], p(m)∈[0, 1 . . . , N−1]. Then UESS set occasions with occasion indices p(m), m=0, 1, . . . , M−1, with be chosen for PDCCH candidate mapping. In some aspects, cyclic shift may be applied, which may be defined as f(m)=mod(Y+p (m), N), m=0, 1, . . . , M−1, wherein Y is the shift. Then UESS set occasions with occasion indices f(m), m=0, 1, . . . , M−1, with be chosen for PDCCH candidate mapping.

In some aspects, the cyclic shift (defined above using Y) may change over time, slots, frames, or based at least in part on a random value or hashing offset. Non-limiting examples of the cyclic shift may include Y=mod(slot number, N), Y=slot number, Y=mod(slot number in a frame, N), Y=slot number in a frame, Y=mod(frame number, N), Y=frame number, Y may be the output of a random generator, or Y may be equal to the PDCCH hashing offset.

In some aspects, the mapping of the search space sets may be based at least in part on a nested structure. For example, the nested search space structure can be used to map multiple aggregation levels without increasing the number of consumed CCEs. Lower aggregation level candidates may be mapped within (e.g., within a footprint of) higher aggregation level candidates. This may be especially useful when a mini-slot is scheduled and when only one aggregation level is actually transmitted by the BS. In some aspects, signaling (e.g., RRC signaling and/or the like) may be used to explicitly specify which search space set is to use a nested structure. In some aspects, the nested structure can be associated with a certain search space set type, such as for mini-slot (e.g., Case 2 scheduling). In some aspects, the nested structure can be associated with certain search space set indices, such as the first or last UESS set.

In some aspects, the mapping of the search space sets (and/or PDCCH candidates associated with the search space sets) may be based at least in part on priority of traffic associated with the search space sets. For example, at least two types of services may be standardized in 3GPP, including Enhanced Mobile Broadband (eMBB) and ultra-reliable low-latency communication (URLLC). In some cases, eMBB and URLLC may use similar (e.g., the same) PDCCH design. The BS 110 (and/or the UE 120) may prioritize URLLC PDCCH to satisfy priority rules associated with URLLC, since URLLC may have higher priority requirement than eMBB. Therefore, when PDCCH candidates are mapped to CCEs, the URLLC PDCCH candidates may be mapped before eMBB PDCCH candidates.

When CORESET level mapping is performed, the BS 110 may assign lower CORESET IDs to URLLC PDCCH candidates, and may assign higher CORESET IDs to eMBB PDCCH candidates. PDCCH candidates may be mapped from a lower CORESET ID to a higher CORESET ID. If search space set level mapping is performed, the BS 110 may assign lower search space set IDs to URLLC PDCCH candidates, and may assign higher search space set IDs to eMBB PDCCH candidates. In this way, if eMBB PDCCHs and URLLC PDCCHs are configured in the same search space set, the BS 110 (e.g., and/or the UE 120) may map URLLC PDCCH candidates before the eMBB PDCCH candidates are mapped.

As indicated above, FIG. 5 is provided as an example. Other examples may differ from what is described with respect to FIG. 5.

Figure 6:
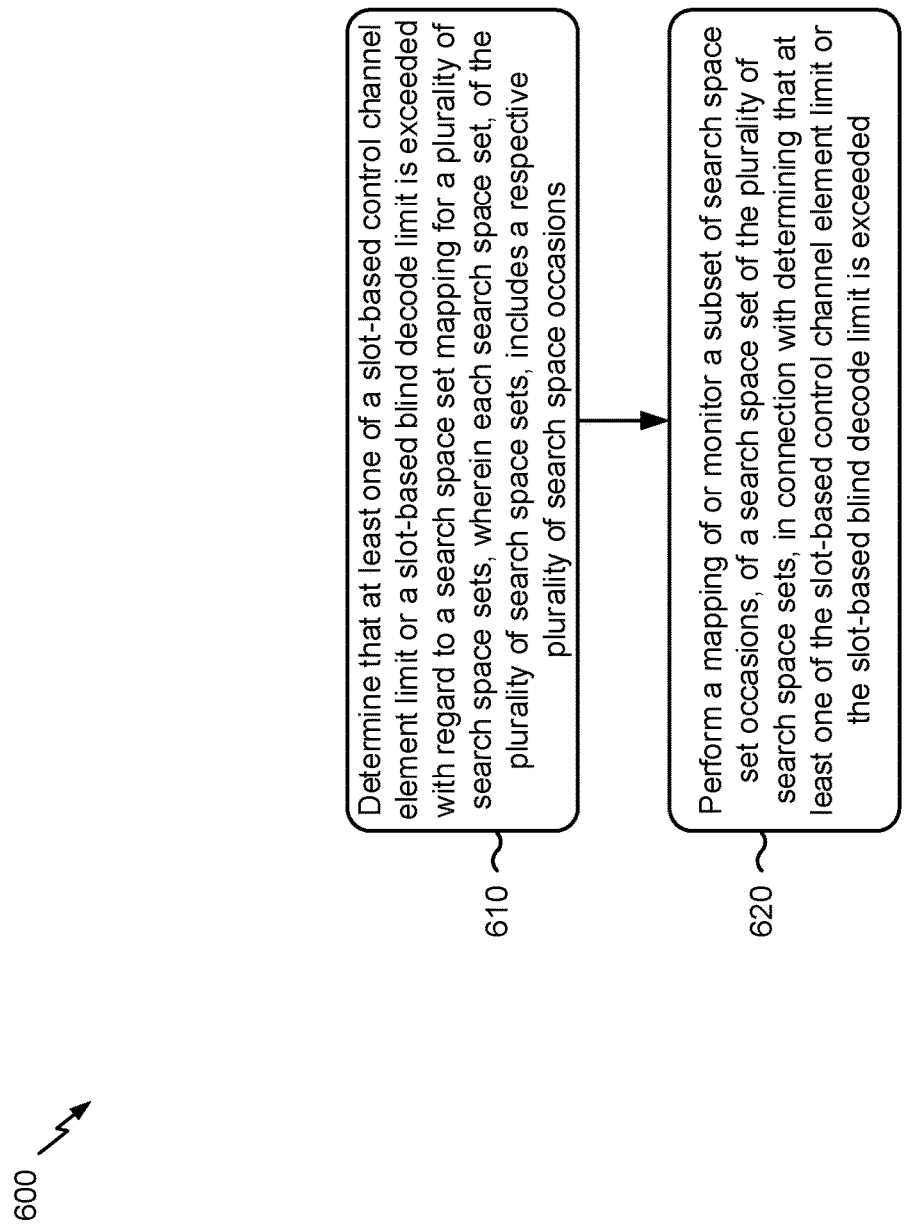
FIG. 6 is a diagram illustrating an example process performed, for example, by a wireless communication device, in accordance with various aspects of the present disclosure.

FIG. 6 is a diagram illustrating an example process 600 performed, for example, by a wireless communication device, in accordance with various aspects of the present disclosure. Example process 600 is an example where a wireless communication device (e.g., BS 110, UE 120, etc.) performs search space set occasion level mapping for PDCCH overbooking.

As shown in FIG. 6, in some aspects, process 600 may include determining that at least one of a slot-based control channel element limit or a slot-based blind decode limit is exceeded with regard to a search space set mapping for a plurality of search space sets, wherein each search space set, of the plurality of search space sets, includes a respective plurality of search space set occasions (block 610). For example, the wireless communication device (e.g., using controller/processor 240, controller/processor 280, and/or the like) may determine at least one of a control channel element (CCE) limit (e.g., a slot-based CCE limit) or a blind decode limit (e.g., a slot-based blind decode limit) is exceeded with regard to a search space mapping. The search space mapping may be for a plurality of search space sets. Each search space set, of the plurality of search space sets, may include a respective plurality of search space set occasions.

As shown in FIG. 6, in some aspects, process 600 may include performing a mapping of or monitoring a subset of search space set occasions, of a search space set of the plurality of search space sets, in the slot in connection with determining that at least one of the slot-based control channel element limit or the slot-based blind decode limit is exceeded (block 620). For example, the wireless communication device (e.g., using controller/processor 240, controller/processor 280, antenna 252, DEMOD 254, MIMO detector 256, receive processor 258, and/or the like) may perform a mapping of or monitor a subset of search space set occasions of a search space set. The subset of search space set occasions may include less than all search space set occasions of the search space set. In some aspects, the search space set may be a next search space set after a previous search space set that was successfully mapped (e.g., without exceeding the blind decode limit or the CCE limit).

Process 600 may include additional aspects, such as any single aspect or any combination of aspects described below and/or in connection with one or more other processes described elsewhere herein.

In a first aspect, the slot does not exceed at least one of the slot-based control channel element limit or the slot-based blind decode limit when the subset of search space set occasions is mapped in the slot. In a second aspect, alone or in combination with the first aspect, if all search space set occasions of the search space set were mapped in the slot, the slot would exceed at least one of the slot-based control channel element limit or the slot-based blind decode limit. In a third aspect, alone or in combination with any one or more of the first and/or second aspects, the mapping is based at least in part on a cyclic shift. In a fourth aspect, alone or in combination with any one or more of the first through third aspects, the cyclic shift is configured to change after a configured number of slots. In a fifth aspect, alone or in combination with any one or more of the first through fourth aspects, the mapping is performed continuously based on occasion indices of the subset of search space set occasions.

In a sixth aspect, alone or in combination with any one or more of the first through fifth aspects, values of occasion indices of the subset of search space set occasions are interleaved before the mapping is performed, and the mapping is in an order corresponding to values of interleaved occasion indices of the subset of search space set occasions. In a seventh aspect, alone or in combination with any one or more of the first through sixth aspects, the mapping is based at least in part on values of occasion indices of the subset of search space set occasions, and the mapping is performed based at least in part on a fixed interval with regard to the occasion indices. In an eighth aspect, alone or in combination with any one or more of the first through seventh aspects, the mapping is based at least in part on a random or pseudorandom permutation of the subset of search space set occasion indices.

In a ninth aspect, alone or in combination with any one or more of the first through eighth aspects, a number of the subset of search space set occasions is determined based at least in part on a configured number or a number of remaining control channel elements for the search space set. In a tenth aspect, alone or in combination with any one or more of the first through ninth aspects, the mapping is based at least in part on a nested search space structure, wherein a lower aggregation level search space set occasion is mapped within a higher aggregation level search space set occasion. In an eleventh aspect, alone or in combination with any one or more of the first through tenth aspects, the nested search space structure is indicated using radio resource control signaling. In a twelfth aspect, alone or in combination with any one or more of the first through eleventh aspects, the nested search space structure is based at least in part on a type of the search space set. In a thirteenth aspect, alone or in combination with any one or more of the first through twelfth aspects, a first control resource set or search space set or candidate, associated with the subset of search space set occasions, that is associated with an ultra-reliable low-latency communication is mapped before a second control resource set or search space set or candidate, associated with the plurality of search space sets, that is associated with enhanced mobile broadband.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
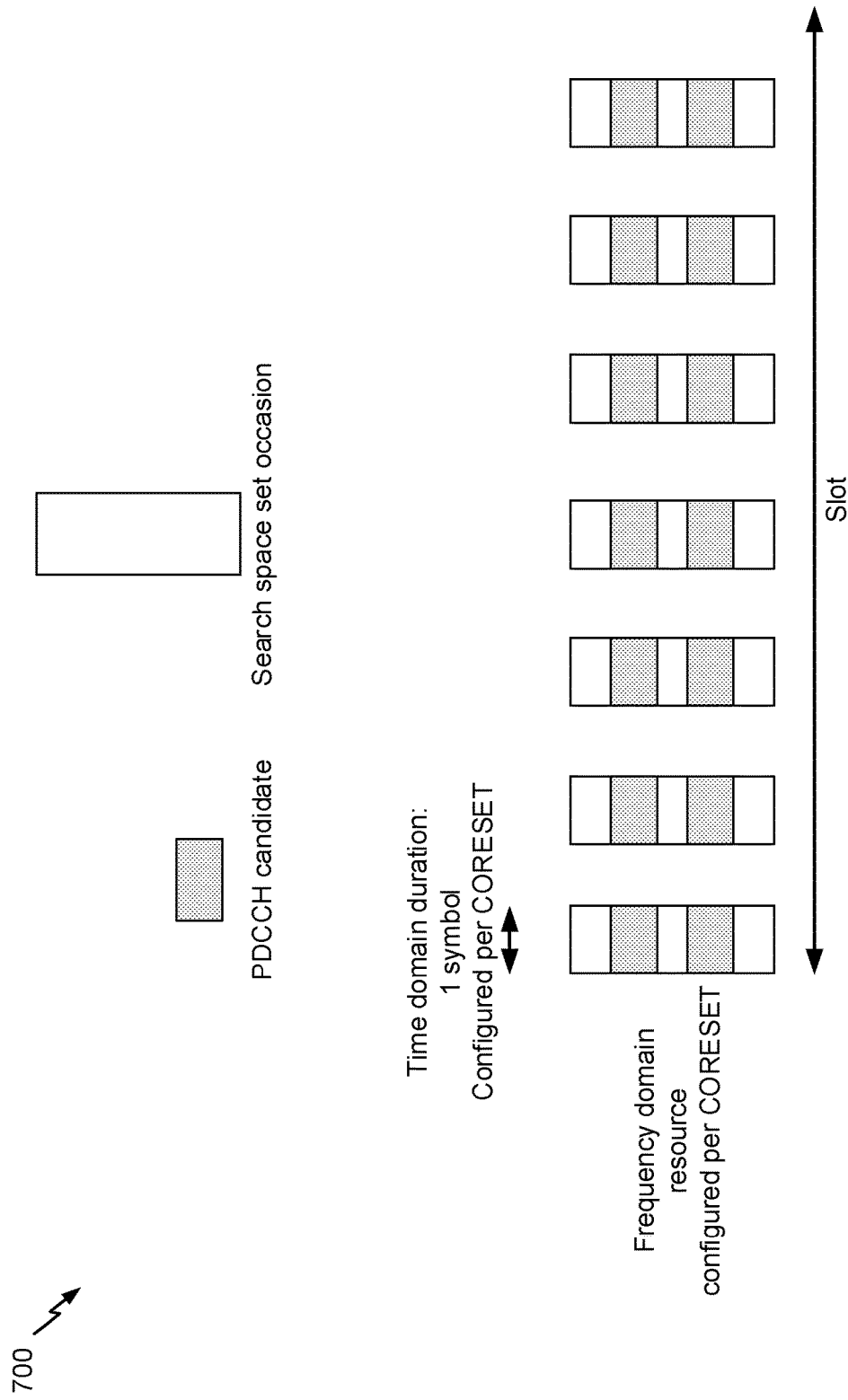
FIG. 7 is a diagram illustrating an example of a control resource set with a search space set.

FIG. 7 is a diagram illustrating an example 700 of a control resource set with a search space set. In example 700, the CORESET is configured with 1 search space set that contains 7 search space set occasions in a slot. The starting symbol indexes in the slot may be 0, 2, 4, 6, 8, 10, 12 for the 7 search space set occasions. Each search space set occasion may contain PDCCH candidates for all configured aggregation levels. A PDCCH candidate for only 1 aggregation level is shown in FIG. 7. A higher aggregation level may have more CCEs for each PDCCH candidate.

As indicated above, FIG. 7 is provided as an example. Other examples may differ from what is described in connection with FIG. 7.

The foregoing disclosure provides illustration and description, but is not intended to be exhaustive or to limit the aspects to the precise form disclosed. Modifications and variations are contemplated in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of aspects. In fact, many of these features may be combined in ways not specifically recited in the claims and/or disclosed in the specification. Although each dependent claim listed below may directly depend on only one claim, the disclosure of aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
performing a search space set mapping of a particular search space set of a plurality of search space sets in a slot,
wherein a slot-based control channel element limit or a slot-based blind decode limit is not exceeded with regard to the search space set mapping of the particular search space set,
wherein at least one of the slot-based control channel element limit or the slot-based blind decode limit would be exceeded with regard to a search space set mapping for a next search space set of the plurality of search space sets, and
wherein each search space set, of the plurality of search space sets, includes a respective plurality of search space set occasions; and
selecting occasion indices for mapping a random or pseudorandom permutated sequence of a subset of search space set occasions of the next search space set,
wherein the slot-based control channel element limit or the slot-based blind decode limit would not be exceeded based on a quantity of search space set occasions in the subset of search space set occasions being mapped; and
performing, based at least in part on selecting the occasion indices, a mapping or monitoring of the random or pseudorandom permutated sequence of the subset of search space set occasions in the slot.

2. The method of claim 1, wherein the subset of search space set occasions includes one or more search space set occasions for a mini-slot and one or more search space set occasions for the slot.

3. The method of claim 1, wherein the slot does not exceed at least one of the slot-based control channel element limit or the slot-based blind decode limit when the subset of search space set occasions is mapped in the slot.

4. The method of claim 1, wherein, if all search space set occasions of the next search space set were mapped in the slot, the slot would exceed at least one of the slot-based control channel element limit or the slot-based blind decode limit.

5. The method of claim 1, wherein the mapping of the random or pseudorandom permutated sequence of the subset of search space set occasions is based at least in part on a cyclic shift.

6. The method of claim 5, wherein the cyclic shift is configured to change after a configured number of slots.

7. The method of claim 1, wherein the mapping of the random or pseudorandom permutated sequence of the subset of search space set occasions is performed continuously based on a sequence of the occasion indices.

8. The method of claim 1, wherein values of occasion indices of the subset of search space set occasions are interleaved before the mapping of the random or pseudorandom permutated sequence of the subset of search space set occasions is performed, and wherein the mapping of the random or pseudorandom permutated sequence of the subset of search space set occasions is in an order corresponding to the interleaved values.

9. The method of claim 1, wherein the mapping of the random or pseudorandom permutated sequence of the subset of search space set occasions is based at least in part on values of a sequence of occasion indices, and wherein the mapping of the random or pseudorandom permutated sequence of the subset of search space set occasions is performed based at least in part on a fixed interval.

10. The method of claim 1, wherein the quantity of search space set occasions in the subset of search space set occasions is based at least in part on a configured number or a quantity of remaining control channel elements for the next search space set.

11. The method of claim 1, wherein the mapping of the random or pseudorandom permutated sequence of the subset of search space set occasions is based at least in part on a nested search space structure, wherein a lower aggregation level search space set occasion is mapped within a higher aggregation level search space set occasion.

12. The method of claim 11, wherein the nested search space structure is indicated using radio resource control signaling.

13. The method of claim 11, wherein the nested search space structure is based at least in part on a type of the next search space set.

14. The method of claim 1, wherein a first control resource set, a first search space set, or a first candidate, associated with the subset of search space set occasions, that is associated with an ultra-reliable low-latency communication is mapped before a second control resource set, a second search space set, or a second candidate, associated with the plurality of search space sets, that is associated with enhanced mobile broadband.

15. A wireless communication device for wireless communication, comprising:
a memory; and
one or more processors coupled to the memory, the memory and the one or more processors configured to:
perform a search space set mapping of a particular search space set of a plurality of search space sets in a slot,
wherein a slot-based control channel element limit or a slot-based blind decode limit is not exceeded with regard to the search space set mapping of the particular search space set,
wherein at least one of the slot-based control channel element limit or the slot-based blind decode limit would be exceeded with regard to a search space set mapping for a next search space set of the plurality of search space sets, and
wherein each search space set, of the plurality of search space sets, includes a respective plurality of search space set occasions; and
select occasion indices for mapping a random or pseudorandom permutated sequence of a subset of search space set occasions of the next search space set,
wherein the slot-based control channel element limit or the slot-based blind decode limit would not be exceeded based on a quantity of search space set occasions in the subset of search space set occasions being mapped; and
perform, based at least in part on selecting the occasion indices, a mapping or monitoring of the random or pseudorandom permutated sequence of the subset of search space set occasions in the slot.

16. The wireless communication device of claim 15, wherein the slot does not exceed at least one of the slot-based control channel element limit or the slot-based blind decode limit when the subset of search space set occasions is mapped in the slot.

17. The wireless communication device of claim 15, wherein, if all search space set occasions of the next search space set were mapped in the slot, the slot would exceed at least one of the slot-based control channel element limit or the slot-based blind decode limit.

18. The wireless communication device of claim 15, wherein the mapping of the random or pseudorandom permutated sequence of the subset of search space set occasions is based at least in part on a cyclic shift.

19. The wireless communication device of claim 15, wherein the mapping of the random or pseudorandom permutated sequence of the subset of search space set occasions is performed continuously based on a sequence of the occasion indices.

20. The wireless communication device of claim 15, wherein the mapping of the random or pseudorandom permutated sequence of the subset of search space set occasions is based at least in part on a nested search space structure, wherein a lower aggregation level search space set occasion is mapped within a higher aggregation level search space set occasion.

21. The wireless communication device of claim 20, wherein the nested search space structure is based at least in part on a type of the next search space set.

22. A non-transitory computer-readable medium storing one or more instructions for wireless communication, the one or more instructions comprising:
one or more instructions that, when executed by one or more processors of a wireless communication device, cause the wireless communication device to:
perform a search space set mapping of a particular search space set of a plurality of search space sets in a slot,
wherein a slot-based control channel element limit or a slot-based blind decode limit is not exceeded with regard to the search space set mapping of the particular search space set,
wherein at least one of the slot-based control channel element limit or the slot-based blind decode limit would be exceeded with regard to a search space set mapping for a next search space set of the plurality of search space sets, and
wherein each search space set, of the plurality of search space sets, includes a respective plurality of search space set occasions; and
select occasion indices for mapping a random or pseudorandom permutated sequence of a subset of search space set occasions of the next search space set,
wherein the slot-based control channel element limit or the slot-based blind decode limit would not be exceeded based on a quantity of search space set occasions in the subset of search space set occasions being mapped; and
perform, based at least in part on selecting the occasion indices, a mapping or monitoring of the random or pseudorandom permutated sequence of the subset of search space set occasions in the slot.

23. The non-transitory computer-readable medium of claim 22, wherein the slot does not exceed at least one of the slot-based control channel element limit or the slot-based blind decode limit when the subset of search space set occasions is mapped in the slot.

24. The non-transitory computer-readable medium of claim 22, wherein, if all search space set occasions of the next search space set were mapped in the slot, the slot would exceed at least one of the slot-based control channel element limit or the slot-based blind decode limit.

25. The non-transitory computer-readable medium of claim 22, wherein the mapping of the random or pseudorandom permutated sequence of the subset of search space set occasions is based at least in part on a cyclic shift.

26. An apparatus for wireless communication, comprising:
means for performing a search space set mapping of a particular search space set of a plurality of search space sets in a slot,
wherein a slot-based control channel element limit or a slot-based blind decode limit is not exceeded with regard to the search space set mapping of the particular search space set,
wherein at least one of the slot-based control channel element limit or the slot-based blind decode limit would be exceeded with regard to a search space set mapping for next search space set of the a plurality of search space sets, and
wherein each search space set, of the plurality of search space sets, includes a respective plurality of search space set occasions; and
means for selecting occasion indices for mapping a random or pseudorandom permutated sequence of a subset of search space set occasions of the next search space set,
wherein the slot-based control channel element limit or the slot-based blind decode limit would not be exceeded based on a quantity of search space set occasions in the subset of search space set occasions being mapped; and
means for performing, based at least in part on selecting the occasion indices, a mapping or monitoring of the random or pseudorandom permutated sequence of the subset of search space set occasions in the slot.

27. The apparatus of claim 26, wherein the slot does not exceed at least one of the slot-based control channel element limit or the slot-based blind decode limit when the subset of search space set occasions is mapped in the slot.

28. The apparatus of claim 26, wherein, if all search space set occasions of the next search space set were mapped in the slot, the slot would exceed at least one of the slot-based control channel element limit or the slot-based blind decode limit.

29. The apparatus of claim 26, wherein the mapping of the random or pseudorandom permutated sequence of the subset of search space set occasions is based at least in part on a cyclic shift.

30. The wireless communication device of claim 18, wherein the cyclic shift is configured to change after a configured number of slots.

* * * * *